United States Patent [19]

Velasco et al.

[11] Patent Number: 4,731,705
[45] Date of Patent: Mar. 15, 1988

[54] CELL FOR ELECTRIC DOUBLE LAYER CAPACITORS AND PROCESS FOR MANUFACTURING SUCH A CELL

[75] Inventors: Gonzal Velasco, Paris; Philippe Adet, Fontenay les Brus; Philippe Colomban, Sevres; Thi M. Pham, Savigny sur Orge, all of France

[73] Assignee: Compagnie Europeenne de Composants Electroniques LCC, Courbevoie, France

[21] Appl. No.: 877,867

[22] Filed: Jun. 24, 1986

[30] Foreign Application Priority Data

Jun. 25, 1985 [FR] France .................. 85 09653

[51] Int. Cl.$^4$ .................. H01G 9/00; B01J 17/00
[52] U.S. Cl. .................. 361/433; 29/570; 29/25.41; 252/62.2
[58] Field of Search .................. 252/62.2; 361/433; 29/25.42, 570

[56] References Cited

U.S. PATENT DOCUMENTS

| | | | |
|---|---|---|---|
| 3,509,426 | 4/1970 | Winn | 361/433 C |
| 3,538,394 | 11/1970 | Bourgault et al. | 361/433 S |
| 3,634,736 | 1/1972 | Boos et al. | 361/433 C |
| 3,700,975 | 10/1972 | Butherus et al. | 361/433 E |
| 4,327,400 | 4/1982 | Muranaka et al. | 361/433 S |

FOREIGN PATENT DOCUMENTS

| | | |
|---|---|---|
| 0044427 | 1/1982 | European Pat. Off. . |
| 2547678 | 6/1983 | France . |
| 2565400 | 3/1984 | France . |

OTHER PUBLICATIONS

Protonic Conductivity of Solid UO2HPO4-3H2O", M. V. Susic et al, 1982, pp. 327-330.

Primary Examiner—Donald A. Griffin
Attorney, Agent, or Firm—Cushman, Darby & Cushman

[57] ABSTRACT

A method for forming a cell and a cell for an electric double layer capacitor includes a membrane formed from a solid protronic conducting electrolyte separating two electrodes. Each electrode is a composite electrode formed by a mixture of at least one electronic conductor and a solid electrolyte. Preferably, the solid electrolyte of the composite electrodes and the membrane is chosen from a group consisting of uranyl phosphate $H_3O\ UO_2\ PO_4\ 3H_2$), zirconium phosphate $Zr(HPO_4)_2nH_2O$, or derivatives of these compounds.

24 Claims, 11 Drawing Figures

FIG_1 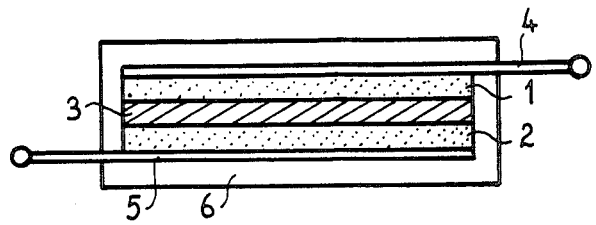
FIG_3-a 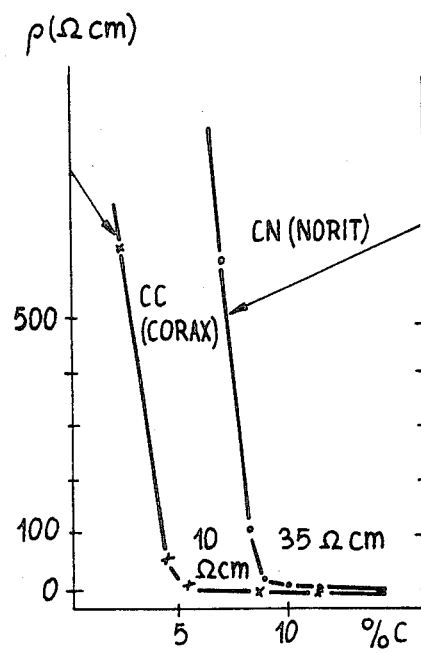
FIG_3-b 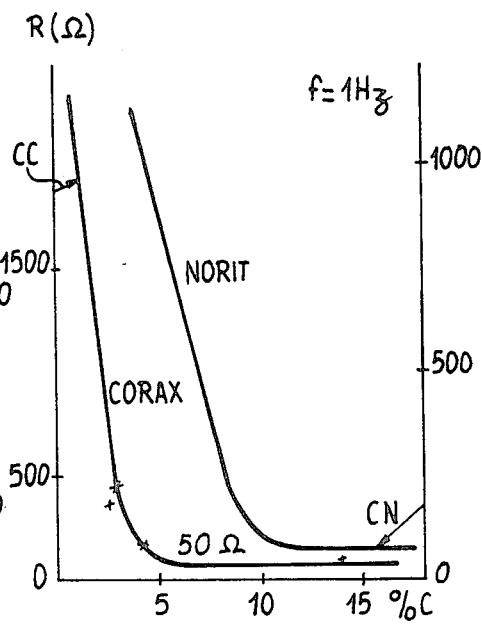
FIG_3-c 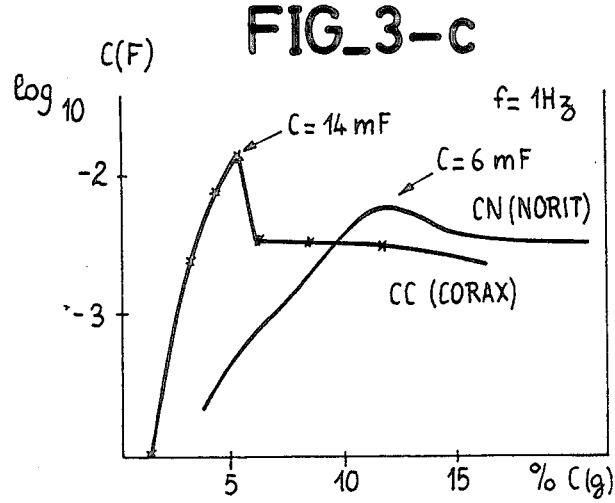

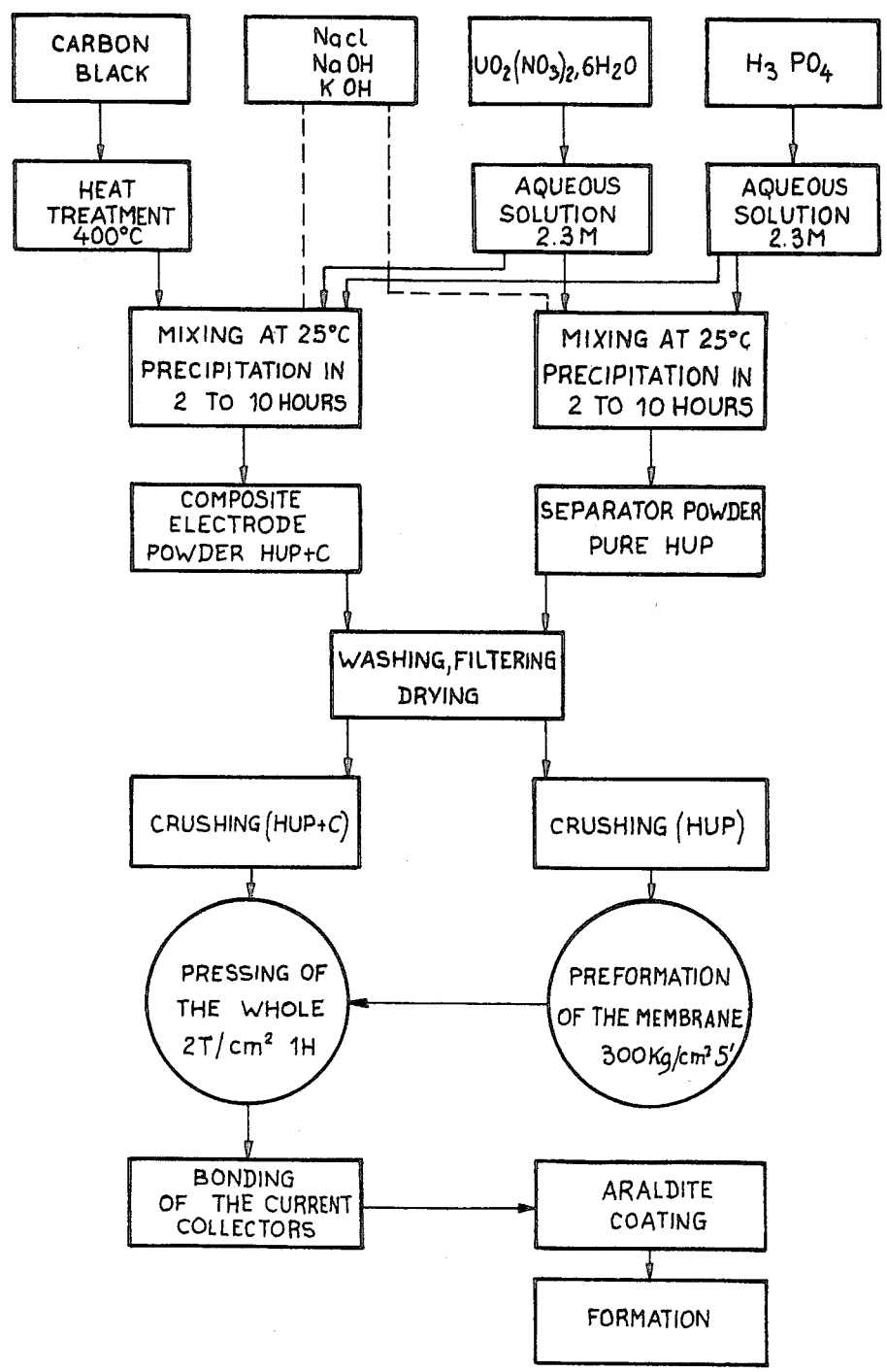
FIG_2

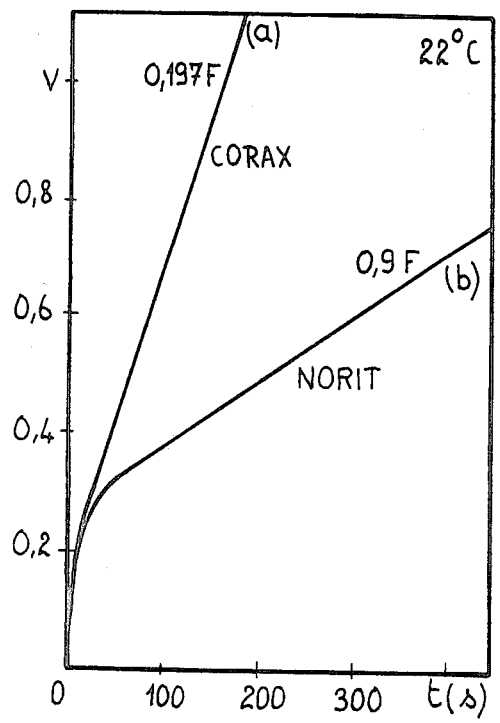
FIG_4
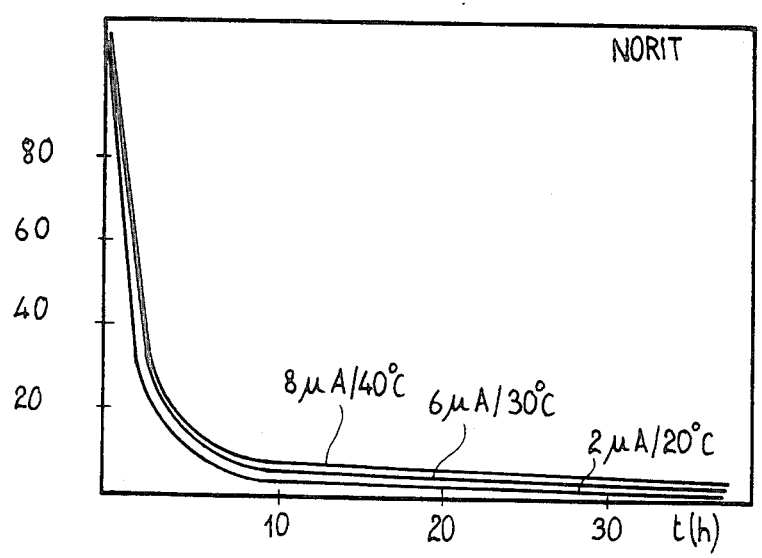
FIG_6

FIG_5-a
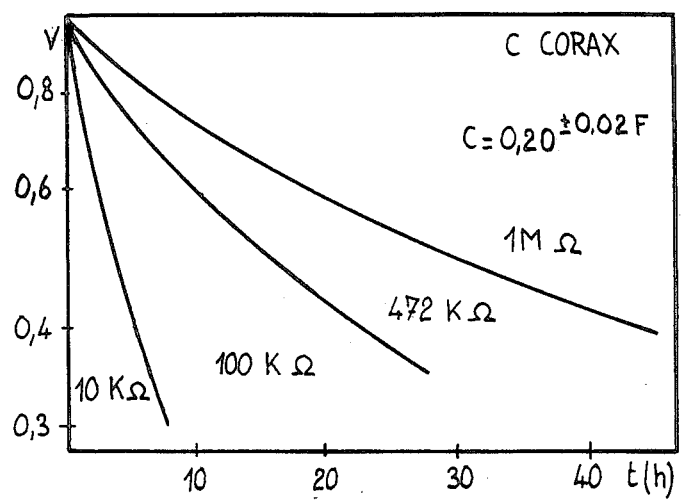
FIG_5-b
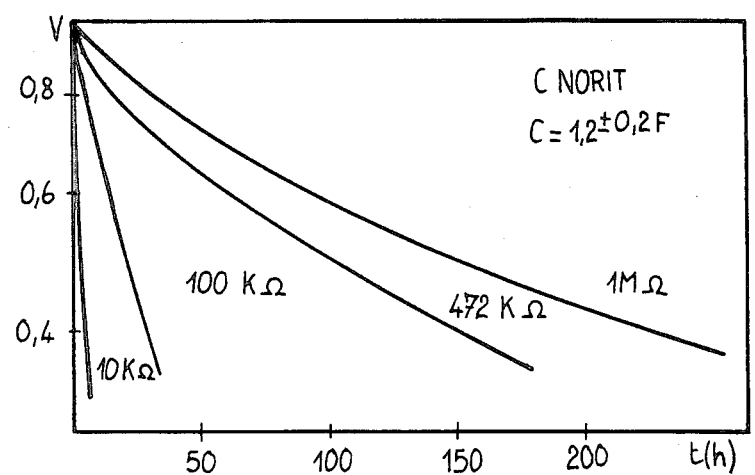

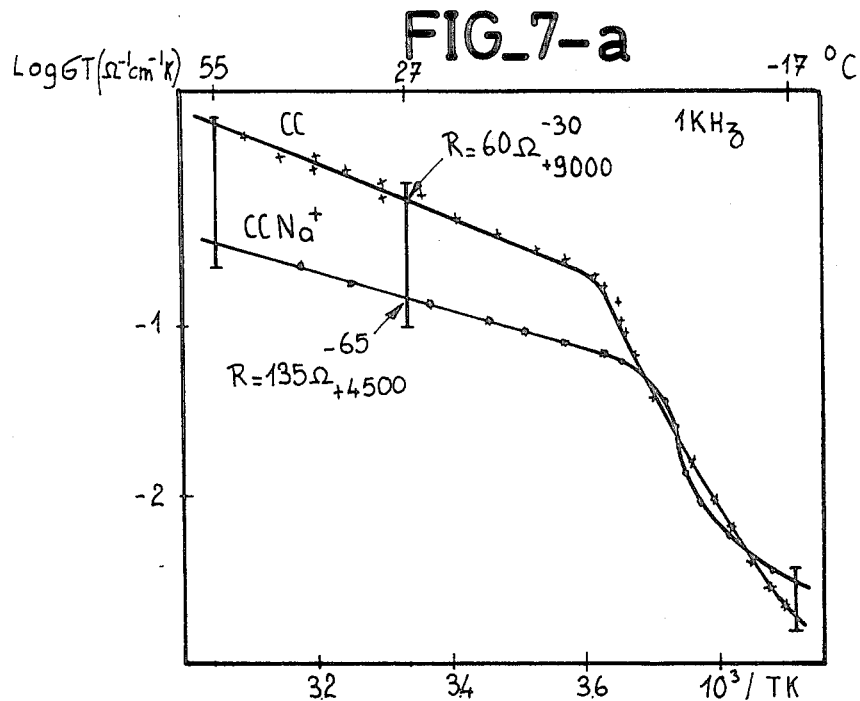
FIG_7-a
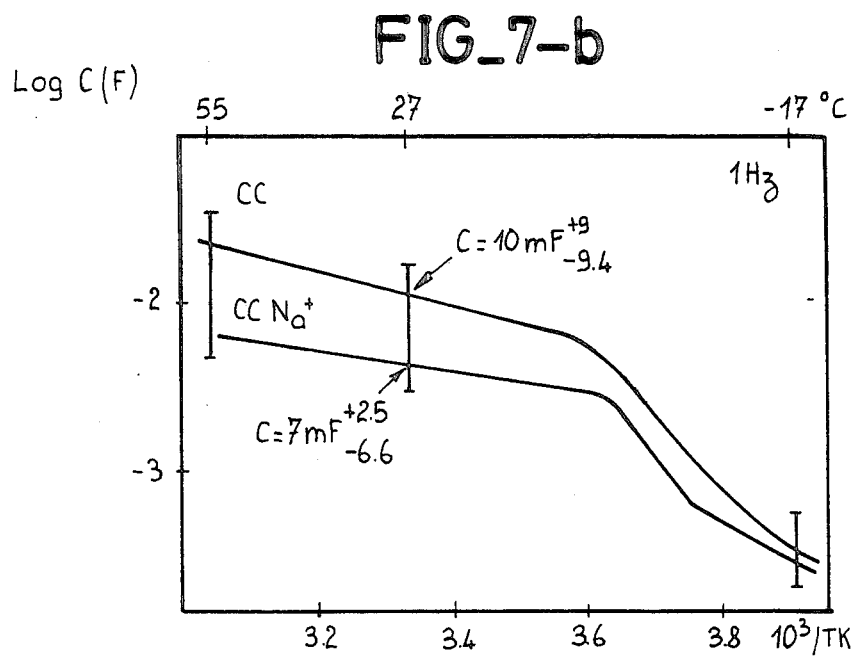
FIG_7-b

CELL FOR ELECTRIC DOUBLE LAYER CAPACITORS AND PROCESS FOR MANUFACTURING SUCH A CELL

BACKGROUND OF THE INVENTION

The present invention relates to a cell for electric double layer capacitors currently called supercapacitors and a process for manufacturing such a cell.

For several years research workers have studied and perfected high capacity capacitors using the principle of electric double layer charge distribution. According to this principle studied by Hermann VON HELMOLZ, at the electrode/electrolyte interface there is formed an accumulation of charged particles and/or oriented electric dipoles. This accumulation is known under the name of double electric layer. The high value of the capacity of this double layer comes from the large number of electric charges accumulated at the interface per unit area, under the action of a potential difference.

These supercapacitors have a merit factor (voltage $\times$ capacity per unit of volume) ten to fifty times greater than that of present electrochemical capacitors such as aluminium and tantalum capacitors. They are therefore particularly well adapted for the delocalized storage of energy in electronic systems.

The capacitors based on this principle are formed essentially by particles of an electronic conductor in contact with an ion conducting electrolyte, the ion conducting electrolyte being either a liquid electrolyte or a solid electrolyte.

In the case of electric double layer capacitors with liquid electrolyte, an elementary cell is formed essentially of two composite electrodes each comprising particles of an electronic conductor, such as activated carbon, imbibed with electrolyte, the two electrodes being separated by a membrane permeable to the ions but electrically insulating. This membrane is in general formed by an electrolyte imbibed polymer which may be dilute sulphuric acid. On the other hand, for bonding the carbon grains and containing the liquid electrolyte, they are mixed with a polymer. However, capacitors using a liquid electrolyte present leakage problems and do not withstand overvoltages. On the other hand, it is necessary to use a polymer for containing the liquid electrolyte.

Electric double layer capacitors with solid electrolyte overcome some of the drawbacks of the capacitors using a liquid electrolyte. The elementary cell of presently known solid electrolyte capacitors is formed by a metal electrode and a composite electrode formed of a mixture of particles of an electronic conductor and a solid electrolyte containing an ionic conductor, the two electrodes being separated by a membrane formed by said solid electrolyte.

This solid electrolyte is chosen more particularly from $RbAg_4I_5$ and $Rb_2Cu_8I_3Cl_7$. The metal electrode is then formed as a function of the conducting ion by silver, copper or a copper based compound such as $Cu^{2+}S$. In this case, however, the structure of the capacitor is a polarized structure and parasite reactions are observed between the electrolyte and the metal electrode which may cause destruction of the capacitor. In addition these solid electrolytes have the disadvantage of having a low decomposition voltage ($<1$ V). It is then necessary to associate a certain number of elementary devices in series so as to obtain the voltage required for their use.

The purpose of the present invention is to provide a new type of cell for electric double layer capacitors which overcomes the above drawbacks.

SUMMARY OF THE INVENTION

Consequently, the present invention provides a cell for electric double layer capacitors comprising a membrane formed of a solid protonic conducting electrolyte separating two electrodes, the two electrodes being composite electrodes formed by a mixture in given proportions of at least one electronic conductor and at least one solid electrolyte.

The solid protonic conducting electrolyte must have ionic conduction as high as possible associated with electronic conductivity as low as possible.

In accordance with the present invention, the solid protonic electrolyte is chosen from a group comprising uranyl phosphate $H_3OUO_2PO_4.3H_2O$, zirconium-phosphate $Zr(HPO_4)_2nH_2O$, the derivatives of these compounds, and other protonic conductors with high protonic conductivity ($\sigma_H+ > 10^{-4} \Omega^{-1} cm^{-1}$), and having a low electric conductivity ($\sigma_e < 10^{-7} \Omega^{-1} cm^{-1}$).

Uranyl phosphate $H_3OUO_2PO_4.3H_2O$, usually designated by the term HUP, will be used preferably for this solid protonic electrolyte is a very good protonic conductor vey well adapted to the construction of high capacity capacitors.

The conductivity of the solid protonic electrolyte material is greater (at ambient temperature for example) by more than two orders of size with respect to that of solid electrolyte materials—or made solid by polymerization—which may be used in a fine layer in contact with a carbon based powder. The result is a series resistance much less than that of devices formed with these other materials (polymer retaining an ionic salt for example).

In addition, the electronic conductivity of a solid protonic electrolyte such as HUP or $Zr(HPO_4)_2nH_2O$ is remarkably low, namely $< 10^{-9} \Omega^{-1} cm^{-1}$, particularly with respect to that of organic polymers containing an ionizable salt, which is a guarantee of low self discharge of the capacitor.

On the other hand, the electronic conductor particles must be such that they allow a maximum interface to be obtained between the particles and the electrolyte. In addition, they must have an electronic conductivity as high as possible (associated with a low ionic conductivity). Consequently, thelectronic conductor particles will be formed from activated carbon black, acetylene black, a mixture of different carbon blacks, carbon black and acetylene black or equivalent products.

Furthermore, the protonic conducting electrolyte forming the membrane or ionic separator may be of a nature different from that forming the mixture in the electrodes.

According to other characteristics of the present invention, the membrane is formed by a protonated species exchanging organic membrane. It may be formed from a porous structure imbibed with an electrolyte.

According to another characteristic of the present invention, the $H_3O^+$ ions of the protonic conductors may be substituted completely or partly by a cation having a high conductivity such as $Na^+$, $Li^+$, $K^+$, $Ca^{2+}$; $Cu^{2+}$, $Ag^+$. This substitution allows the temperatures of the transitions to be shifted, their effects to be smoothed out and the capacitor to be operated at low temperatures. This substitution may be formed in the material of the membrane, of the electrode or both.

A very important characteristic of the crystallized solid electrolytes is the fact that only the conducting cations may move under the action of the potential difference This advantage is decisive with respect to the materials retaining an ionizable alkaline salt $M^+X^-$ such as the polymers for example, for the simultaneous presence of cations and anions greatly increases the leakage current and the series resistance.

According to an additional characteristic of the present invention, in order to avoid the possible dehydration of HUP above 80° C., the cell is preferably coated with a sealing material.

The present invention also relates to a method of producing such a cell for an electric double layer capacitor.

This method comprises the following steps:
formation of the powder for composite electrodes,
formation of the powder for the membrane,
preformation of the membrane by pressing,
simultaneous sintering of the two electrodes and the membrane,
positioning of the metal terminators,
encapsulation and previous electric formation.

In a preferred embodiment, the powder for the composite electrodes is obtained by double percolation of the electronic conductor and of the solid electrolyte in the form of powders, the preparation taking place in the aqueous solution itself during mixing, at a given temperature for a given time, of the reagents so as to obtain an electrolyte precipitate enclosing the electronic conductor, for the electronic conductor is in given proportions so as to obtain the percolation threshold leading to the lowest resistivity and the highest capacity. Precipitation is followed by washing, filtering, drying and crushing operations.

It follows that the intimate mixture of the two materials (solid electrolyte, electronic conductor) exists on a microscopic scale. Depending on the conditions they must envelop each other mutually, including the porosity, while leaving double percolation possible.

On the other hand, when the electrolyte is formed by $H_3OUO_2PO_4.3H_2O$ or HUP, the HUP powder is obtained by causing an equimolar mixture of two solutions of uranyl nitrate and phosphoric acid to precipitate, at ambient temperature, in an aqueous medium and with permanent agitation for the period of 2 to 10 hours.

BRIEF DESCRIPTION OF THE DRAWINGS

Other features and advantages of the present invention will be clear from the following description of several methods of manufacturing the cell, with reference to the accompanying drawings in which:

FIG. 1 is a sectional view of a cell for an electric double layer capacitor in accordance with the present invention, FIG. 2 is a diagram giving the main steps for manufacturing a cell in the case where the electrolyte is HUP, FIGS. 3a to 3c are different curves giving the evolution of the electronic resistivity of the composite electrode, of the series resistance and of the capacity at 1 Hz of two capacitors constructed in accordance with the present invention as a function of the percentage of carbon black in the composite electrode, FIGS. 4, 5(a and b), 6 and 7(a and b) show respectively the charge curve at I=1 mA, the curve for discharge in different resistors, the variation of the leakage current as a function of the temperature for two capacitors formed in accordance with the present invention as well as the shift of curve C=f(t) at the end of doping in the case of a HUP capacitor with electrodes made from $Na^+$ doped CORAX.

DESCRIPTION OF THE PREFERRED EMBODIMENTS

In FIG. 1 there is shown schematically a sectional view of a cell for an electric double layer capacitor in accordance with the present invention.

This cell is formed essentially of two electrodes 1, 2 separated by a membrane 3 permeable to the ions but insulating with respect to the electrons. Membrane 3 is formed by a solid containing a protonic conducting solid electrolyte totally or in part if the grains of the electrolyte percolate. This electrolyte is chosen from uranyl phosphate $H_3OUO_2PO_4.3H_2O$, zirconium phosphate $Zr(HPO_4)_2nH_2O$, the derivatives of these compounds or the other protonic conductors with high protonic conductivity ($\sigma_{H^+} > 10^{-4} \Omega^{-1} cm^{-1}$) having a low electronic conductivity ($\sigma_e < 10^{-7} \Omega^{-1} cm^{-1}$). Preferably uranyl phosphate, called HUP, will be used which is a hydrate with lamella structure comprising a layer of protonated water sandwiched between two layers $(UO_2PO_4)n$. The conductivity of HUP is highly anisotropic and, as a function of the rate of orientation of the crystallites in the material, the ionic conductivity varies between $5 \cdot 10^{-4}$ and $5 \cdot 10^{-3} \Omega^{-1} cm^{-1}$ at 20° C. and the electronic conductivity is less than $10^{-9} \Omega^{-1} cm^{-1}$.

The membrane may also be an organic protonated species exchanging membrane. It may be formed by a porous structure imbibed with an electrolyte.

On the other hand, the two electrodes 1, 2 are composite electrodes formed by a mixture of at least one electronic conductor and at least one solid electrolyte. This solid electrolyte may be different from or identical to the one forming the membrane, preferably chosen from those mentioned above. The electronic conductor must have a high electric conductivity. The electric conductor is in general formed by activated carbon black, more particularly the activated carbon black sold under the trademark CORAX LX6 which has a specific area of 265 m²/g with a grain size of about 180Å or the activated carbon black sold under the trademark NORIT RB6 which has a specific area of 1150 m²/g with a grain size between 10 and 50 μm.

Equivalent compounds such as acetylene black may also be used.

In fact, the great fineness of the powders used and/or their large area allow a maximum interface to be obtained between the electronic conducting powder and the electrolyte and consequently a high capacity per unit of volume.

As shown in FIG. 1, two metal terminators 4, 5 are fixed to the composite electrodes 1 and 2. These terminators 4, 5 are made from a good electrically conducting material such as copper. On the other hand, the assembly of the above elements is coated in an insulating material such as araldite so as to provide good sealing.

Thus an entirely solid, symmetrical and non polarized structure is obtained.

A method of manufacturing a cell in accordance with the present invention will now be described with reference to the diagram of FIG. 2. This method is described in the case where the solid electrolyte used is HUP and the electronic conductor carbon black. However, a similar method may be used with the other electrolytes mentioned above.

In accordance with the present invention, the HUP electrolyte is prepared first of all in the form of a powder. The HUP powder is synthesized by precipitation at ambient temperature, namely at a temperature of about 25° C., in an aqueous medium, from an equimolar mixture of two solutions of 2, 3 moles of uranyl nitrate ($UO_2(NO_3)_2 6H_2O$) and phosphoric acid ($H_3PO_4$). Permanent agitation for a period of 2 to 10 hours leads to the precipitation of the compound. Possibly, an ionic solution such as NaOH, $NaNO_3$, NaCl, KCl, LiCl..., may be added to the mixture of the two solutions, which allows the $H_3O^+$ ions to be substituted wholly or partially by $Na^+$, $K^+$, $Li^+$ cations having good ionic conductivity. Thus a shift of the temperature of the HUP transition is obtained and lowering of the conductivity variation associated with this transition as shown in FIGS. 7(a) and (b) which give the case where HUP contains 10% of $Na^+$. Other ionic solutions such as those containing $Ca^{2+}$, $Cu^{2+}$ or $Ag^+$ may also be considered. A mixture of the above solutions may also be used. The precipitate thus obtained is separated from the mother solution by decantation then washed rapidly once with a phosphoric acid $H_3PO_4$ solution having a pH of 2 then two or three times with distilled water. The precipitate is then filtered on sintered glass. The powder thus obtained whose grain size may vary between 4 microns and 50 micron dependsing on the adopted conditions, is equilibrated in ambient air having a humidity from 60% to 80% for about 24 hours then disintegrated by means of a mortar for example. If necessary, the powder thus obtained may be stored in closed flasks. The characteristics of the HUP powder used for manufacturing the separator and the composite electrode are given in the following table 1.

TABLE I

Characteristic of the HUP powder used for manufacturing the separator and the composite electrode Color: pale yellow
Grain size: $4 \times 5 \times 0.2$ $\mu m^3$
Chemical stability: PH > 2, 0,014M < $\Sigma PO_4^{3-}$ < 6,1M
Thermal stability: T° < 100° C.

The composite electrodes formed in the manufacturing method described are prepared simultaneously by mixing HUP and activated carbon black such as CORAX LX6 or NORIT RB6, as mentioned above. To improve the electric and chemical properties of the carbon black, it is subjected to heat treatment. Thus, by heating it at 400° C. for a night in an argon atmosphere or for two hours in a vacuum, the leakage current is decreased to below 2 $\mu A$. Furthermore, this heat treatment leads to improving the sintering of the composite electrode during shaping.

Then, so as to obtain the powder for the composite electrode, the carbon black, newly heat treated, is dispersed in an aqueous solution of $UO_2(NO_3)_2 6H_2O$ before adding phosphoric acid. The mixture is then made as for the electrolyte. The precipitate obtained is then subjected to washing, filtering and drying operations similar to those used for obtaining the electrolyte. The relative proportions of carbon black and HUP are determined experimentally so as to obtain the percolation threshold leading to the lowest resistivity and the highest capacity. Thus, in the case of NORIT, the optimum proportion by weight will be 10/90 and in the case of CORAX it will be 5/95 as can be seen from the curves of FIG. 3.

The characteristics of the activated carbon black used in the manufacture of the composite electrodes as well as the composition of the composite electrode are given in tables 2 and 3 below.

TABLE 2

| Characteristics of the activated carbon black used in the manufacture of the composite electrodes | | |
|---|---|---|
| | Corax L6 | Norit SB |
| Color | Black | Black |
| Specific area | 265 $m^2/g$ | 1150 $m^2/g$ |
| Grain size (mean size of the grains) | 18 nm | 10 $\mu m$ |
| Density | 20 g/l | 290 g/l |
| Ash content | 0.2% | 5% |
| pH | 7.5 | 6.8 |

The carbon black CORAX L6 is manufactured by Degussa-France and Norit SB by Norit Incorporation.

TABLE 3

| Composition of the composite electrode | | |
|---|---|---|
| Electrode Materials | Capacitor | Capacitor |
| Active charcoal | (Corax L6) 5–6% | Norit 10–12% |
| Solid electrolyte | 95%–94% | 90%–88% |
| Dispersion agent | None | None |
| Color | Black | Greyish yellow |

Before using them for manufacturing an elementary cell, the HUP and composite electrode powders are recrushed finely with a mortar, for example, for several minutes. This operation is necessary so as to obtain good sintering subsequently. Then performation of the membrane is carried out. This preformation is necessary so as to avoid diffusion of the carbon in the membrane and so as to thus obtain an electrically insulating membrane. The precompaction of the membrane which may be formed, in the embodiment used, from 130 mg of pure HUP, is carried out at 300 Kg/cm² for 5 minutes. Then, in a mold, are introduced successively 160 mg of the mixture forming the lower electrode which is distributed uniformly, the precompacted membrane, then 160 mg of the mixture forming the upper electrode. The whole is pressed at 2t/cm² for 1 hour. It is important to carry out sintering of the two electrodes and of the membrane together, for a chemical interface is obtained between the elements resulting in a reduction of the series resistance. This interface is due to the fact that the powders, during sintering, undergo dissolution and recrystallization at the contact points therebetween. In the case where sintering of the electrodes and of the membrane is carried out separately, the interface is solely physical and the series resistance is increased by at least one order of size. Thus, a wafer is obtained of 0.75 cm² for a thickness of 0.2 cm.

Then, the metal terminators which may be formed by two copper plates are disposed on each side of the wafer and bonded by means of a copper charged epoxy bonding agent polymerizing at ambient temperature. Preferably, this operation is carried out under a slight pressure. The whole is then coated in a thick layer of araldite so as to obtain good sealing. It is obvious for a man versed in the art that other materials may be used for the terminators, bonding and coating without departing from the scope of the invention.

Then the electric formation of the coated cell is provided by subjecting it to a voltage of 1 volt at a temperature of 50° C. The formation time depends on the temperature. The pressure and the pressing time may be modified. A higher pressure reduces the pressing time. This operation greatly improves the quality of the contact between HUP crystallites and carbon grains. Thus, for NORIT, the capacity passes from 0.4 F to 0.9 F and from 0.176 F to 0.2 F for CORAX.

On the other hand, FIG. 4 shows the charging curve carried out with a constant current I=1 mA and at ambient temperature for NORIT and CORAX type capacitors, FIG. 5 the discharge across different types of resistors, (10, 110, 472 k$\Omega$ and 1M$\Omega$), the capacitor being charged at 1 volt, and FIG. 6, the variation of the leakage current as a function of the temperature for a NORIT type capacitor.

The typical characteristics of a capacitor of the present invention are (at 20° C.):

continuous capacity 0.2 to 1 F
equivalent series resistance $\leq 50\Omega$
leakage resistance measured at 1 V Rf=$5\times 10^5 \Omega$ Furthermore, these capacitors have very good resistance to mechanical shocks and to vibrations, a long life span and low cost. Moreover, they may be produced in the form of thin ($<100\mu$) or thick ($>500\mu$) layers.

To bring out the advantages of the electric double layer capacitor of the present invention with respect to capacitors of the same type present on the market, a comparison of the DC performances of some of them has been made. The results of this comparison are given in the following table.

TABLE 4

| Cell | C/RbAg$_4$I$_5$/Ag Solid | C/H$_2$SO$_4$/C Liquid | C/Rb$_2$Cu$_3$Cl$_7$/ Cu or Cu$^{2+}$S Solid | C/HUP/C Solid |
|---|---|---|---|---|
| Voltage (V) | 0.66 | 3 $\times$ 1.66$^+$ | 1.6 | 2 |
| Capacity (F) | 5 | 1 | 1 | ~1 |
| Energy density (J/cm$^3$) | 1.27 | 0.5 | 1.3 | 6 |
| Leakage current (uA) | 6.6 | 120 | 5 | <2 |
| C.V leak current (dry) | 2 10$^{-6}$ | 24 10$^{-6}$ | 3.1 10$^{-6}$ | 2.5 10$^{-6}$ |
| Storage temperature range | 300-343 | 248-343 | 263-343 | 230-340 |

25 + 3 cells in the device

A method has been described for manufacturing a cell in the case where the solid electrolyte is HUP. However, the same method may be used with other electrolytes, only certain conditions of use will change such as the percolation threshold, the formation temperatures or similar.

Furthermore, it is obvious for a man skilled in the art that several cells such as those described above may be assembled together in a known way so as to obtain a capacitor of desired capacity.

What is claimed is:

1. A cell for an electric double layer capacitor, comprising:

a membrane formed of a solid protonic conducting electrolyte separating two electrodes; and two electrodes each comprising a composite electrode including a mixture of predetermined proportions of at least one electronic conductor and at least one solid electrolyte, said solid electrolyte of said composite electrode comprising a protonic conductor chosen from a group consisting of uranyl phosphate H$_3$OUO$_2$PO$_4$.3H$_2$O, zirconium phosphate Zr(HOP$_4$)$_2$nH$_2$O, derivatives of these compounds and protonic conductors with high protonic conductivity having a low electronic conductivity.

2. The cell as claimed in claim 1, wherein said solid protonic conducting electrolyle of said membrane comprises a protonic conductor chosen from a group consisting of uranyl phosphate H$_3$OUO$_2$PO$_4$.3H$_2$O, zirconium phosphate Zr (HPO$_4$)$_2$nH$_2$O, derivatives of these compounds and protonic conductors with high protonic conductivity having a low electronic conductivity.

3. The cell as claimed in claim 2, wherein the H$_3$O$^+$ ions are substituted wholly or partially by a cation.

4. The cell as claimed in claim 3, wherein the cation is chosen from the group consiting of Na$^+$, Li$^+$, K$^+$, Ca$^{2+}$, Ag$^+$.

5. The cell as claimed in claim 1, wherein the electronic conductor comprises one of activated carbon black, acetylene black or a mixture of different carbon blacks and/or acetylene black.

6. The cell as claimed in any one of claims 1 to 5, wherein said solid protonic conducting electrolyte forming the membrane is of a nature different from the solid electrolyte comprising the mixture in the electrodes.

7. The cell as claimed in any one of claims 1 to 6, wherein said membrane, comprises an organic protonated species exchanging membrane.

8. The cell as claimed in any one of claims 1 to 7, wherein said membrane comprises a porous structure imbibed with an electrolyte.

9. The cell as claimed in any one of claims 1 to 8, further including first and second metal terminators respectively mounted on the two electrodes.

10. The cell as claimed in any one of claims 1 to 9, encapsulated in an insulating material.

11. A method of manufacturing a cell for an electric double layer capacitor, comprising the following steps:

forming a composite electrode powder comprising an electronic conductor and a solid electrolyte;

forming a membrane powder including a solid protonic conducting electrolyte;

preforming a membrane by pressing said membrane powder;

simulteanously sintering two electrodes having said composite electrode powder, and said membrane;

positioning two metal terminators on said electrodes, respectively; and encapsulating said cell.

12. The method as claimed in claim 11, wherein said step forming the composite electrode powder includes the step of forming a mixture by dispersing the electronic conductor in an aqueous solution of solid electrolyte constituents, and agitating said mixture at a predetermined temperature for a predetermined time so as to obtain an electrolyte precipitate enclosing the electronic conductor.

13. The method as claimed in claim 12, wherein said step of forming said composite powder includes the step of forming said solid electrolyte and said electronic conductor in predetermined proportions to obtain a composite powder with a lowest resistivity and a highest capacity.

14. The method as claimed in claim 12, wherein said step of forming said composite powder includes the step of forming said composite powder using a powdered electronic conductor which has been previously heat treated.

15. The method as claimed in any one of claims 11 to 14, wherein said step of forming said composite powder includes the step of forming a precipitate comprising said electronic conductor and said solid electrolyte, and the steps of washing, filtering, drying and crushing said precipitate.

16. The method as claimed in claim 11, further including the step of forming both said solid electrolyte and said solid protonic conducting electrolyte with $H_3OUO_2PO_4.3H_2O$, the $H_3OUO_2PO_4.3H_2O$ powder by causing an equimolar mixture of 2 solutions of uranyl nitrate and phosphoric acid to precipitate at ambient temperature, in an aqueous medium, with permanent agitation for a period of 2 to 10 hours.

17. A cell for an electric double layer capacitor comprising:

a membrane formed of a solid protonic conducting electrolyte separating two electrodes, said solid protonic conducting electrolyte of said membrane comprising a protonic conductor chosen from a group consisting of uranyl phosphate $H_3OUO_2.PO_4.3H_2O$, zirconium phosphate $Zr(HPO_4)_2nH_2O$, derivatives of these compounds and protonic conductors with high protonic conductivity having a low electronic conductivity; and two electrodes each comprising a composite electrode including a mixture of predetermined proportions of at least one electronic conductor and at least one solid electrolyte.

18. A cell as claimed in claim 17, wherein said solid electrolyte of said composite electrode comprises a protonic conductor chosen from a group consisting of uranyl phosphate $H_3OUO_2PO_4.3H_2O$, zirconium phosphate $Zr(HOP_4)_2nH_2O$, derivatives of these compounds and protonic conductors with high protonic conductivity having a low electronic conductivity.

19. The cell as claimed in claim 17, wherein the $H_3O^+$ ions are substituted wholly or partially by a cation.

20. The cell as claimed in claim 19, wherein the cation is chosen from the group consisting of $Na^+$, $Li^+$, $K^+$, $Ca^{2+}$, $Ag^+$.

21. The cell as claimed in claim 17 wherein the electronic conductor comprises one of activated carbon black, acetylene black, or a mixture of different carbon blacks and/or acetylene black.

22. The cell as claimed in claim 17 wherein said solid protonic conducting electrolyte forming the membrane is of a nature different from the solid electrolyte comprising the mixture in the electrodes.

23. The cell as claimed in claim 17 wherein said membrane comprises an organic protonated species exchanging membrane.

24. The cell as claimed in claim 17 wherein said membrane comprises a porous structure imbibed with an electrolyte.

* * * * *